| United States Patent [19] | [11] Patent Number: 4,849,086 |
| Hütsch et al. | [45] Date of Patent: Jul. 18, 1989 |

[54] ELECTRODE FOR ELECTROCHEMICAL PROCESSES

[75] Inventors: Bruno Hütsch; Wolfgang Vesper, both of Bonn, Fed. Rep. of Germany

[73] Assignee: Ringsdorff-Werke GmbH, Bonn, Fed. Rep. of Germany

[21] Appl. No.: 127,657

[22] Filed: Dec. 2, 1987

[30] Foreign Application Priority Data

Dec. 13, 1986 [DE] Fed. Rep. of Germany ....... 3642605

[51] Int. Cl.$^4$ ............................................. C25B 11/12
[52] U.S. Cl. ...................................... 204/294; 429/42
[58] Field of Search ........................... 204/294; 429/42

[56] References Cited

U.S. PATENT DOCUMENTS

| 2,556,830 | 1/1947 | Thrune | 204/294 |
| 3,755,243 | 8/1973 | Emanuelson et al. | 260/38 |
| 4,511,442 | 4/1985 | Pellegri | 204/294 |
| 4,661,740 | 4/1987 | Knoch et al. | 252/502 |

FOREIGN PATENT DOCUMENTS

| 1249232 | 9/1967 | Fed. Rep. of Germany | 204/294 |
| 2213389 | 3/1972 | Fed. Rep. of Germany | . |

*Primary Examiner*—John F. Niebling
*Assistant Examiner*—Kathryn Gorgos
*Attorney, Agent, or Firm*—Herbert L. Lerner; Laurence A. Greenberg

[57] ABSTRACT

An electrode for use in an electrochemical process which is particularly suitable for use as an anode for an electrophoretic process includes a phenolformaldehyde resin matrix and a filler dispersed therein which is produced by graphitization of carbon black coke. Such electrodes are more stable, particularly in contact with oxidizing media, than carbon and graphite containing electrodes having a filler of different origin.

8 Claims, No Drawings

ELECTRODE FOR ELECTROCHEMICAL PROCESSES

The invention relates to an electrode for electrochemical processes, formed of a resin matrix and a graphite filler dispersed in the matrix.

It is known to use electrodes formed of graphite or even carbon for numerous electrochemical processes, e.g. in the electrolysis of aqueous solutions or the production of electrical energy in fuel cells. Such electrodes are produced from mixtures which essentially contain a carbon-containing solid such as petroleum coke, anthracite, carbon black or the like, and a carbonizable binder, e.g. pitch or even synthetic resin. Shaped bodies which are produced from the mixtures, are heated for carbonization of the binder to a temperature of about 1300 K. and bodies formed essentially of carbon are obtained. The terms graphite or graphitic refer to bodies which have been heated to a temperature of about 2600 to 3000 K. irrespective of the actual structural degree of regularity. In conformity with linguistic usage, carbon bodies subjected to a temperature treatment in the region of about 2600 to 3000 K. are, therefore, also referred to as graphitic, irrespective of the crystal structure thereof. Carbon electrodes and especially graphite electrodes, in particular anodes, are generally resistant in so far as oxygen or other oxidizing agents are not formed anodically as electrolysis products. Due to the porosity of the carbon and graphite bodies, the electrodes disintegrate quite rapidly when in contact with oxidizing agents, since the oxidative attack is not limited to the outer surface of the body but extends even to the surface of the pores and accordingly over practically the entire volume of the body. It is known to reduce the extent of the reacting carbon or graphite surface and accordingly the rate of combustion by impregnation of the porous bodies with inert substances, e.g. hardenable synthetic resins. However, since all synthetic resins used as impregnating agents age, especially under conditions to which they are exposed as part of the electrode in an electrochemical process, the effect is generally limited with respect to time. Furthermore, the high cost which is necessary for an effective impregnation is also disadvantageous.

Another group of electrodes contains a resin matrix in which carbon or graphite powders are dispersed as a filler. As compared with carbon electrodes, the low usage temperatures which are determined by the thermal stability of the resin matrix, only significantly limit the range of usage since electrodes of this type are used predominantly at room temperature or at slightly higher temperatures. An electrode which is specified for fuel cells may be formed, for example, of 5 to 25% of a heat hardenable phenolic synthetic resin and 75 to 95% of graphite powder with a particle size of 0.04 to 0.16 mm, as in German Published, Non-Prosecuted Application DE-OS No. 22 13 389. For the production of the electrodes, resin, graphite powder and a dispersion agent are mixed and the mixture is compacted into plate shaped bodies at temperatures up to about 480 K.

Electrodes of this type are more stable than electrodes of pure carbon or graphite, when in contact with oxidizing acting substances. However, the service life of this type of electrode is generally not sufficient under these conditions, so that a need has developed to improve the operating life of electrodes for electrochemical processes essentially containing graphite as a filler and a resin matrix.

It is accordingly an object of the invention to provide an electrode for electrochemical processes, which overcomes the hereinafore-mentioned disadvantages of the heretofore-known products of this general type.

With the foregoing and other objects in view there is provided, in accordance with the invention, a corrosion resistant electrode for electrophoresis, comprising a matrix of cured phenolformaldehyde resin and a filler formed of graphitized carbon particles produced by graphitizing a coked mixture of carbon black and pitch, or by graphitization of carbon black coke.

In this context, the term "carbon black coke" is understood to refer to coke produced from carbon black-pitch binder mixtures. Carbon blacks, such as furnace black or thermal black and coal tar pitch are mixed in approximately equal parts and the mixture is shaped into bodies which are heated for carbonization of the binder to a temperature of about 1300 K. The product is then essentially formed of pitch coke bound carbon black. According to the invention, the heating of the carbon black coke is essentially to the usual temperature for the graphitization of carbon bodies of about 2800 to 3000 K. Graphitized carbon black coke differs significantly in structure and properties from coke which is not heated to graphitization temperature, from electrographite produced from petroleum coke and from natural graphite. The structural degree of regularity is essentially less than the degree of regularity of other types of graphite, the product is harder and surprisingly it is also essentially more resistant to electrochemical oxidation.

The invention is based on the recognition that electrodes containing carbon black coke graphitized as a filler in a phenol formaldehyde resin matrix, possess a higher operating life than electrodes with other graphitic fillers or a matrix of another synthetic resin. The operating life increases approximately proportionally with the proportion of graphitized carbon black coke used as a filler. Preferably, the proportion thereof should amount to at least 30% by weight, with the remaining amount, as appropriate, being formed of types of graphite with a lower specific electrical resistance, e.g. graphitized petroleum coke. The mean particle size of the graphitized filler should amount to appropriately 10 to 30 $\mu$m. Particle packings of higher uniformity are obtained with the finely ground particles. Coarser grain influences the homogeneity and strength of the electrode, with a higher proportion of matrix resin being required for a filler with finer granulation and with electrodes being obtained with a comparatively large electrical resistance. For example, the granulation of the graphitized filler may be compared as follows: <0.005 mm—10%, 0.005 to 0.02 mm—40%, 0.02 to 0.06 mm—40%, >0.06 mm—10%. The proportion of matrix resin in the electrode preferably amounts to 20 to 60% by weight, with the amount depending in each case on the particle size of the filler and the shaping process used. The amount is appropriately determined by simple tests.

In order to produce the electrodes, the ground fillers which are at least 30% graphitized carbon black coke, are mixed with phenol formaldehyde resin. Suitable resins are of the resol type, to which methanol or another solvent are optionally added, as well as powdered novolacs with a hardener such as hexamethylenetetramine. Mixing is carried out with the usual stirring or kneading mixers. The mixtures are pressed into plates or similar bodies at room temperature, with the pressing pressure amounting to about 0.1 to 1 MPa, and are heated to about 400 to 500 K. for hardening the resin mixture. In another process, the mixture is pressed at a temperature of about 450 K. and hardened in the mold. When the mixture possesses sufficient fluidity, for example as a result of the addition of a higher proportion of resin, the electrode can be shaped in a conventional manner, even by injection presses.

The pore-free electrodes have a bulk density of 1.55 to 1.65 g/cm$^3$. The specific electrical resistance preferably amounts to at most 30,000 and at least 10,000 $\mu\Omega$cm, the flexural strength amounts to at least 50 MPa and preferably 50 to 90 MPa and the compressive strength amounts to 100 to 200 MPa. The electrodes are suitable for all electrochemical processes operated at temperatures below about 400 K. Examples of such processes are electrolysis with aqueous or organic electrolytes, electrochemical baths, fuel cells and conductivity measuring cells. A use as an anode in electrophoretic processes is especially advantageous since comparatively very long service lives are attained.

The electrochemical resistance of an electrode according to the invention, containing equal parts of graphitized carbon black and petroleum coke, with a maximum particle size of 0.05 mm, and a phenol formaldehyde resin matrix proportion of 50%, is described in a comparative manner below. The properties of the electrodes connected as anodes in a 10% aqueous solution of oxalic acid were: bulk density 1.60 g/cm$^3$, specific electrical resistance 20,000 $\mu\Omega$cm, flexural strength of 70 MPa and compressive strength of 160 MPa.

Other features which are considered as characteristic for the invention are set forth in the appended claims.

Although the invention is illustrated and described herein as embodied in an electrode for electrochemical processes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will best be understood from the following description of specific examples.

| Composition of electrodes | Mean current density A/dm$^2$ | Experimental time h | Loss in weight % |
| --- | --- | --- | --- |
| Vitreous carbon | 40 | disintegrated | |
| Electro-graphite | 40 | disintegrated | |
| Electro-graphite with PVDF matrix | 38 | 1 | 0.02 |
| | | 3 | 4.7 |
| | | 8 | 7.8 |
| Natural graphite with phenol formaldehyde resin matrix | 42 | 8 | 0.14 |
| | | 16 | 6.6 |
| Example (according to the invention) | 38 | 8 | 0.10 |
| | | 24 | 1.4 |

Wherein PVDF = Polyvinylidene fluoride.

We claim:

1. Corrosion resistant electrode for electrophoresis, comprising a matrix of cured phenolformaldehyde resin and a filler formed of graphite powder, said filler containing a portion of at least 30% by weight of graphitized carbon particles produced by graphitizing a coked mixture of carbon black and pitch.

2. Electrode according to claim 1, wherein said filler has a mean particle size amounting to 10 to 30 $\mu$m.

3. Electrode according to claim 1, wherein the electrode contains 20 to 60% by weight of said resin matrix and 40 to 80% by weight of said filler.

4. Electrode according to claim 1, wherein the electrode has a bulk density of 1.55 to 1.65 g/cm$^3$.

5. Electrode according to claim 1, wherein the electrode has a specific electrical resistance of at least 10,000 $\mu\Omega$cm.

6. Electrode according to claim 1, wherein the electrode has a flexural strength of at least 50 MPa.

7. Electrode according to claim 1, wherein the electrode has a compressive strength of from 100 to 200 MPa.

8. Electrode according to claim 1, wherein the electrode is an anode.

* * * * *